Feb. 23, 1932.   W. H. WELCH   1,846,170
TESTING APPARATUS FOR MOTOR VEHICLES
Filed July 21, 1928   5 Sheets-Sheet 1
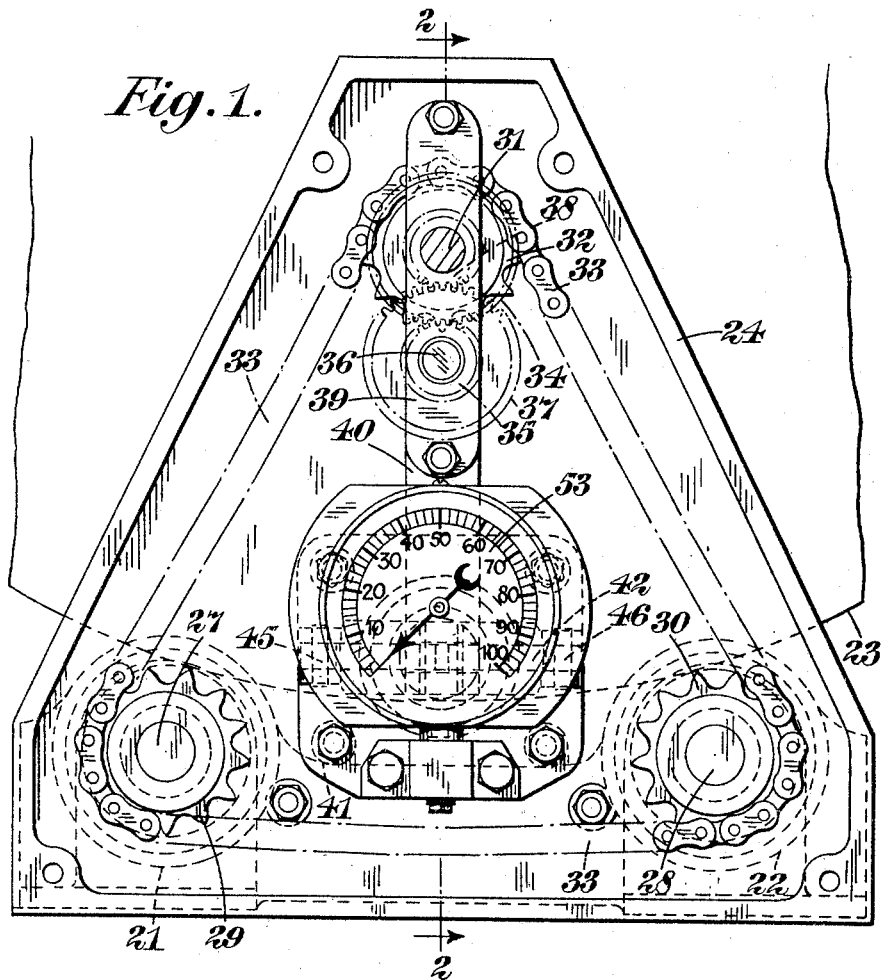
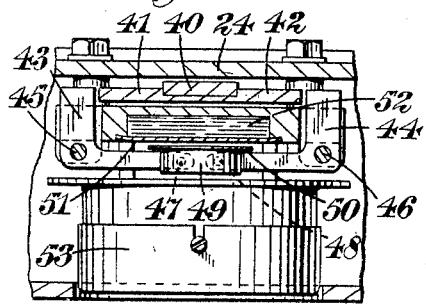
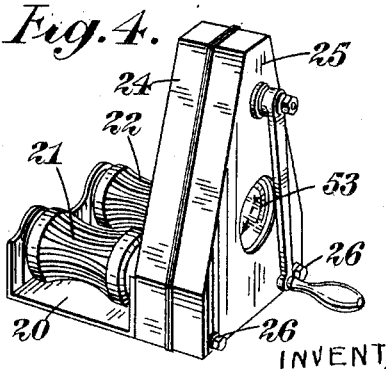
INVENTOR
W. H. Welch
By Wilkinson & Huista
ATTORNEYS

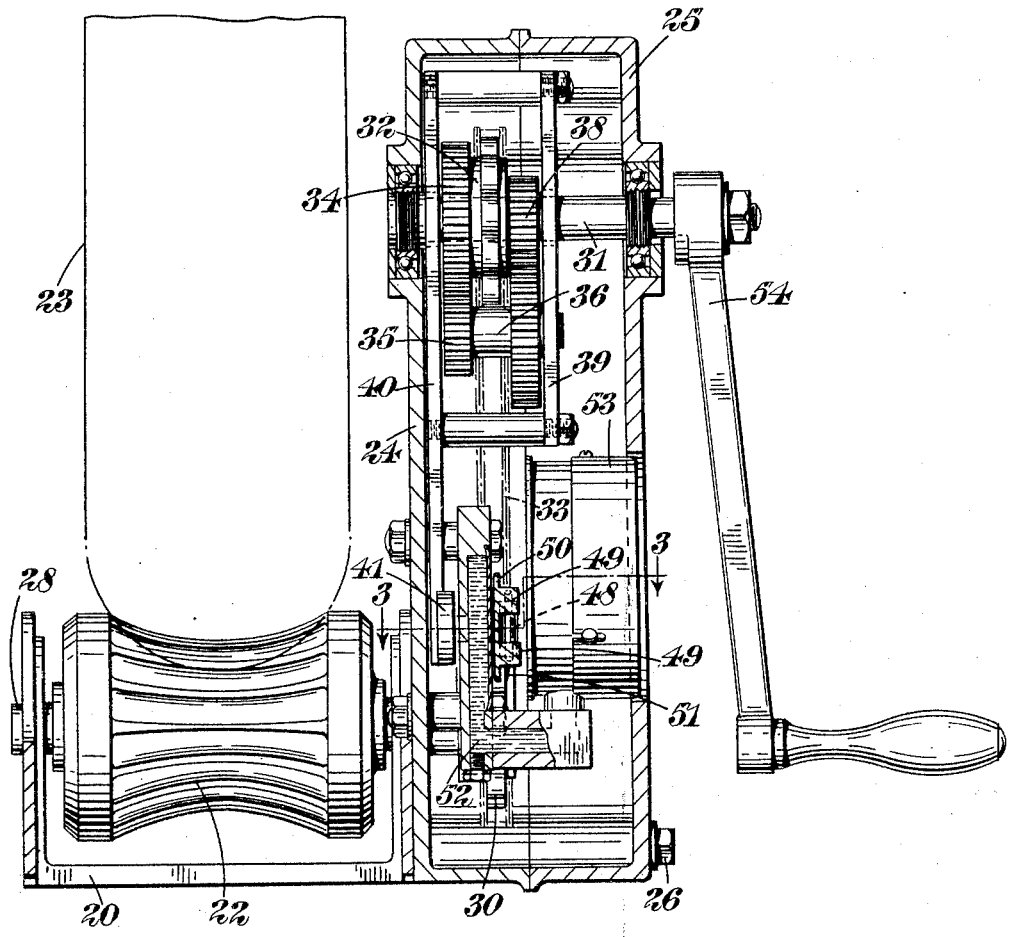

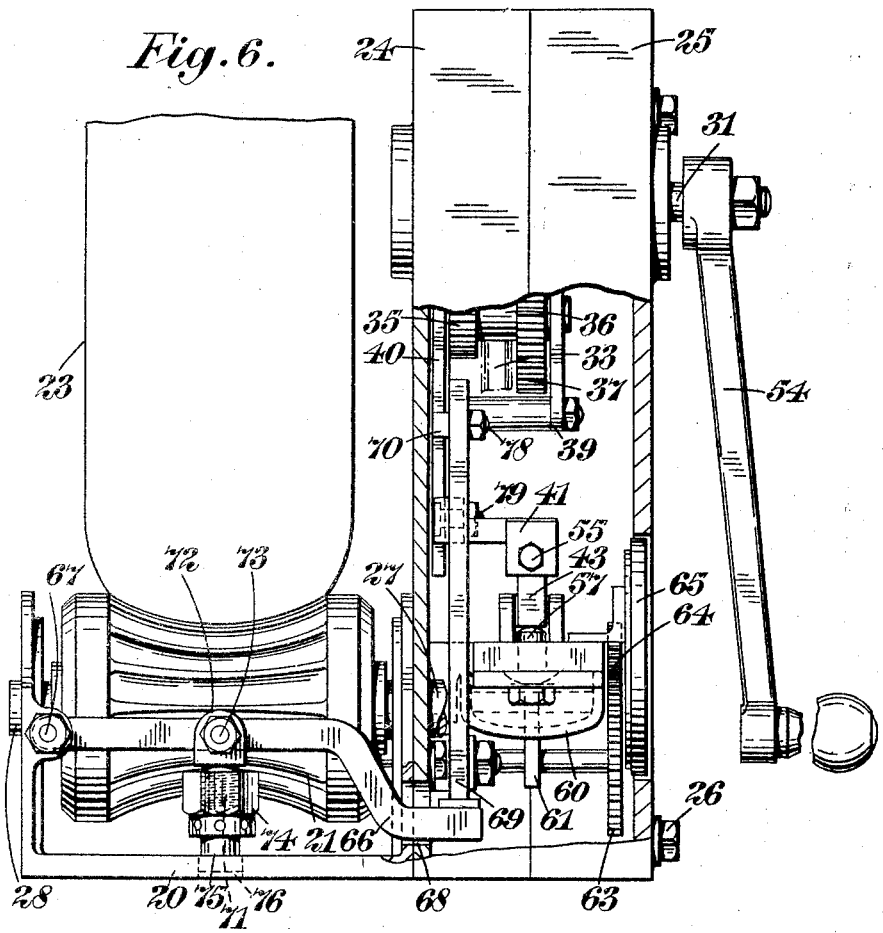
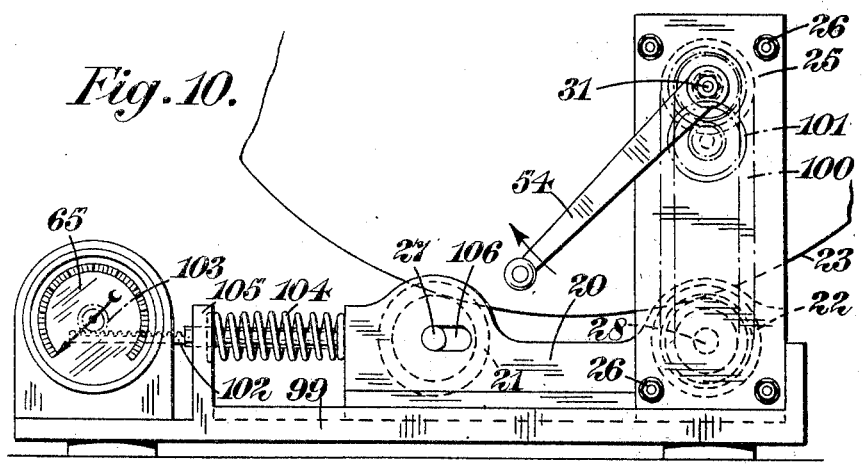

Feb. 23, 1932.  W. H. WELCH  1,846,170
TESTING APPARATUS FOR MOTOR VEHICLES
Filed July 21, 1928   5 Sheets-Sheet 4
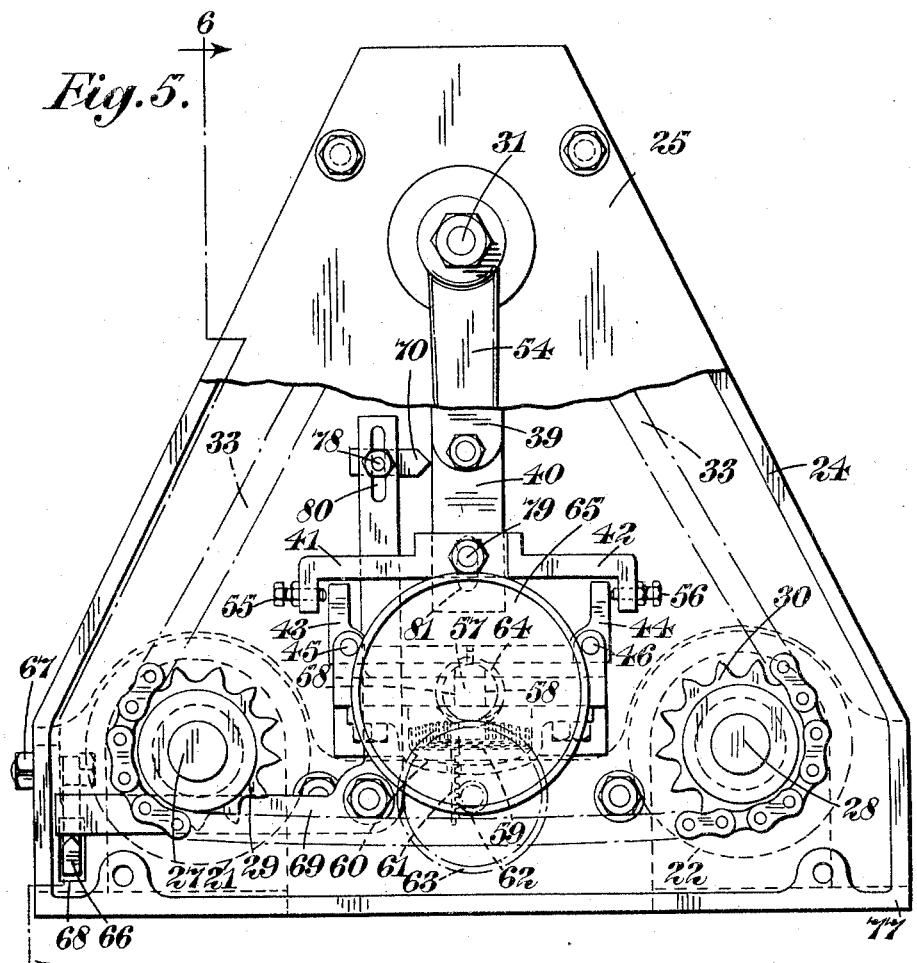
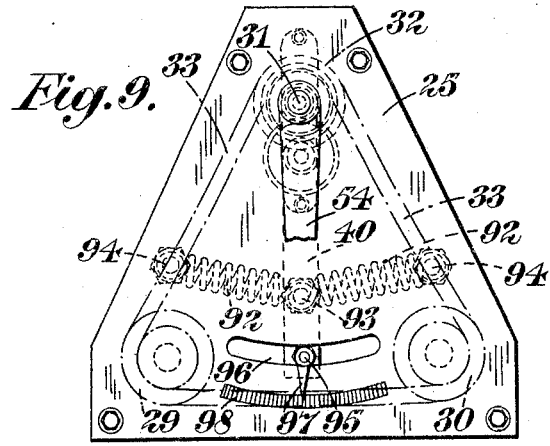
INVENTOR
W. H. Welch
By Wilkinson & Smith
ATTORNEY Feb. 23, 1932.  W. H. WELCH  1,846,170
TESTING APPARATUS FOR MOTOR VEHICLES
Filed July 21, 1928   5 Sheets-Sheet 5
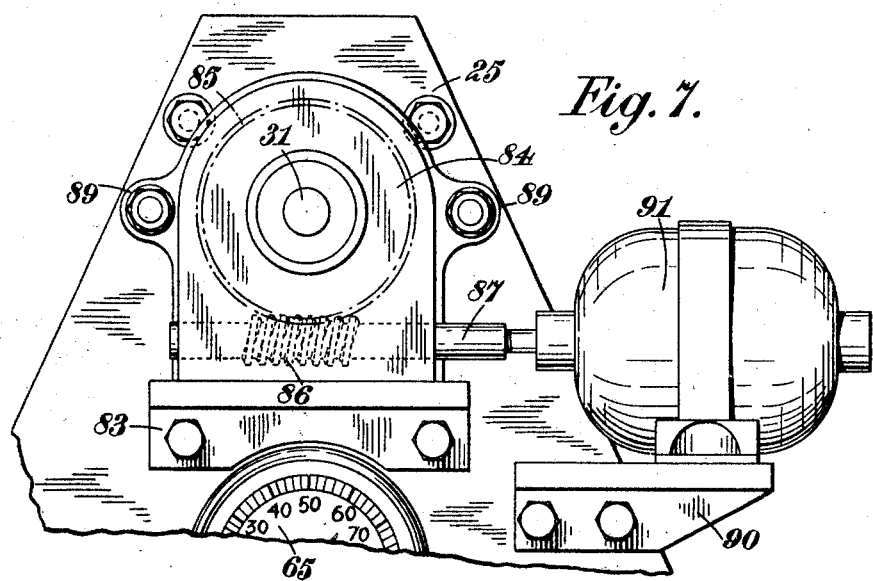
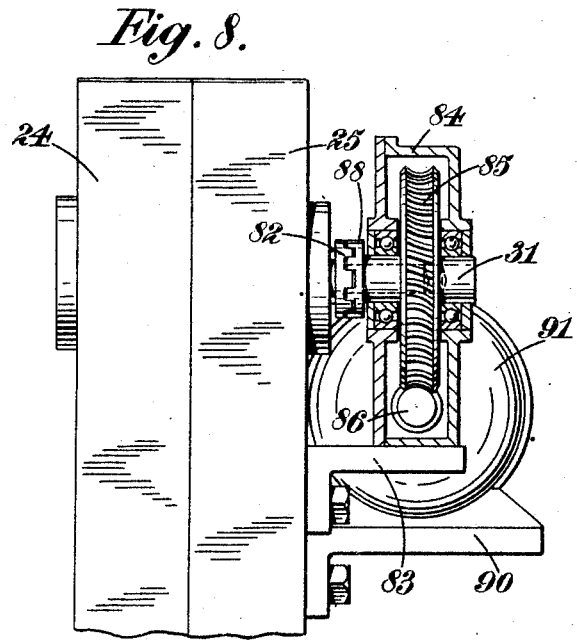
INVENTOR
W. H. Welch
By Wilkinson & Giusta
ATTORNEYS Patented Feb. 23, 1932

1,846,170

UNITED STATES PATENT OFFICE

WALTER HENRY WELCH, OF BRISTOL, ENGLAND

TESTING APPARATUS FOR MOTOR VEHICLES

Application filed July 21, 1928, Serial No. 294,535, and in Great Britain December 30, 1927.

This invention is for improvements in or relating to testing apparatus for motor vehicles, whereby the efficacy of the brakes can be measured. The ability to test the brakes of a vehicle is of importance, particularly in regard to the setting or adjustment of the brakes so that they are applied with equal force to both driving-wheels or both steering-wheels and in the correct ratio as between driving-wheels and steering-wheels. It is a particular object of this invention to provide an apparatus which can be constructed in a light portable and simple form for hand operation, is inexpensive, and can be used in places where external driving power, such for example, as a generating set and connections for actuating an electric motor, is not available. Furthermore, to provide such a construction that the car is tested with its wheels in a natural or normal position bearing the weight of the vehicle; if a vehicle is jacked up to render a wheel available for testing, the distribution of the stresses and the clearances in the wheel, axle, springs and associated parts are quite different from normal running conditions so that a true reading cannot be obtained unless the wheel is supporting the vehicle in the ordinary way.

According to one feature of the present invention, there is provided a portable apparatus for testing the braking power applied to the road wheels of a motor vehicle, which apparatus comprises a pair of rollers whereon a roadwheel can stand, a manually rotatable shaft, driving means interposed between said shaft and at least one of said rollers whereby a drive can be imparted to the road-wheel, and means for measuring the torque which is thus applied. By putting on the brake of the wheel which is being driven, a measure of the braking resistance is obtained and the brakes can be readily adjusted to give the desired equality or desired ratio as between the different wheels.

According to another feature of this invention, the driving means for the rollers aforesaid comprises gearing so arranged that one element of it is free to move, for example, epicyclically, under the reaction of the driving torque, and means for restraining such movement by a measuring device.

Preferably, one or both of the rollers aforesaid is operatively connected with a reduction gear which is in the form of a back gear, but has the secondary shaft so mounted that it can swing through a small angle about the axis of the main shaft of the gear, and means are provided whereby the movement is restrained by an arm which engages a measuring device such as a compression-spring or the flexible wall of a hydraulic chamber connected to a pressure gauge. When the train of gearing aforesaid is driven, the reaction tends to move the secondary shaft, and this movement is restrained by the pressure exerted in the hydraulic chamber or by the spring, each of these devices providing an easy means for measuring the amount of such reaction, and therefore, of the driving torque.

The desirable braking effort for each road-wheel is proportional to the load on that wheel; hence, it follows that if the load on a particular wheel is known, then the correct braking force can be determined. Another object of the present invention is to provide means whereby the said load can be readily ascertained.

According to another feature of the invention, and with the foregoing object in view, a brake-testing device comprises means for measuring the load on each of the road-wheels.

Preferably, the load-measuring means and the torque-measuring means are both operatively connected to a common indicating-dial.

Conveniently, the load-measuring means comprises a pivoted lever operatively connected to the wheel-supporting rollers, so as to support them, and to a pivoted arm adapted to actuate a measuring device, such as a spring, or the flexible wall of a hydraulic chamber connected to a pressure-gauge, which arm constitutes one member of the torque-measuring means, so that when the system is in equilibrium the pressure exerted by the spring or in the hydraulic chamber is a measure of the weight of the road-wheel on the wheel-supporting rollers.

The mechanism may be such that in order to ascertain the load on the road-wheel, the pivoted lever aforesaid has to be raised, and this may be effected by means of a device (e. g. a screwthreaded rod and a rotatable nut thereon) which is operatively connected to said pivoted lever so that the latter can be raised against the reaction of the ground.

For a more complete understanding of the invention, several constructions in accordance therewith will now be described by way of example with reference to the accompanying drawings, in which:—

Figure 1 is a front elevation of one construction with the cover-plate removed;

Figure 2 is a sectional elevation on the line 2—2 of Figure 1;

Figure 3 is a part sectional plan on the line 3—3 of Figure 2;

Figure 4 is a perspective view, drawn to a smaller scale, of the complete apparatus;

Figure 5 is a similar view to Figure 1 of a modification embodying load-measuring means;

Figure 6 is a sectional elevation on the line 6—6 of Figure 5;

Figure 7 is a front elevation showing means for driving the main shaft of the apparatus by an electric motor;

Figure 8 is a side elevation, partly in section, of Figure 7.

Figure 9 is a diagrammatic front elevation of a further modification, and

Figure 10 is an elevation of still another modification.

Like reference numerals indicate like parts in the various figures of the drawings.

In the construction shown in Figures 1 to 4, inclusive, a trough-shaped member 20 has a pair of rollers 21, 22 mounted in it, one towards each end. These rollers may be cylindrical, but are preferably hollowed in longitudinal cross-section to suit the tyres of the wheel 23 indicated in chain-lines in Figures 1 and 2 which they are to engage, and they may be roughened, ribbed or perforated, to provide good frictional engagement with the tyres. On one side of the trough 20 there is mounted a triangular upstanding casing which is formed in two parts 24, 25 adapted to be secured together by bolts and nuts, such as are indicated at 26. Each of the roller-shafts 27, 28 extends into the said casing and carries a chain-sprocket 29, 30 respectively. At the apex of the triangular casing there is mounted loosely on a shaft 31 another chain-sprocket 32 and a single chain 33 extends around the three sprockets. If desired, the chain 33 may connect only the sprocket 32 and one of the sprockets 29, 30, one of the rollers 21, 22 being an idler. The chain-sprocket 32 is coupled to a gear-wheel 34 also loose on the shaft 31 which engages a pinion 35 which is loosely mounted on a secondary shaft 36, and is coupled to a gear-wheel 37 also loose on the shaft 36. The gear-wheel 37 meshes with a pinion 38 fixed to the shaft 31, the whole providing a reduction gear. The secondary shaft 36 is carried by radial arms 39, 40 and the arm 40 is extended downwardly towards the base of the casing. At its lower end, the arm 40 carries laterally-projecting arms 41, 42 which engage each one arm of a pair of bell-crank levers 43, 44, these levers being pivoted about vertical axes 45, 46, respectively, situated forwardly of the arm 40. The other arms of the bell-crank levers 43, 44 are directed towards one another and are connected by pins 47, 48, respectively, to lugs 49 on a plate 50 adapted to bear on a flexible diaphragm 51 forming one wall of a chamber 52 filled with oil or other suitable liquid, and the parts are so disposed that movement of the depending arm 40 aforesaid in one direction or the other tends to rock one or other of the bell-cranks 43, 44 so that its second arm presses the plate 50 upon the diaphragm 51 and is thereby restrained from further movement. It will be understood that the said other arms of the bell-crank levers 43, 44 are slotted to permit the necessary movement of said arms relatively to the pins 47, 48 when the bell-crank levers are rocked.

The pressure exerted on the diaphragm is measured by means of a pressure-gauge 53 in communication with the interior of the chamber 52.

It will be seen that when a vehicle is disposed with one of its driving-wheels on the rollers 21, 22, or each of its driving-wheels on a separate apparatus, a drive can be imparted to the road-wheels by means of a handle 54 operating through the gearing and chain-drive 33 to the rollers 21, 22. If the brakes be applied on the road-wheels, additional effort is required to turn them, and reaction to this driving effort at the reducing gear is resisted by the oil in the closed chamber 52, and measured by the pressure-gauge 53 so that a reading of the absolute braking effort is obtained. The pressure-gauge 53 may be calibrated to show the desirable braking effort for different weights of vehicles, or this information may be provided on a chart.

In the construction shown in Figures 5 and 6, the downwardly-extending arm 40 aforesaid carries laterally-projecting arms 41, 42 in each of which an adjusting screw 55, 56, respectively, is mounted. The said screws engage each one arm of a pair of bell-crank levers 43, 44 which are pivoted about horizontal axes 45, 46, respectively. The other arms of these bell-crank levers are directed towards one another and bear on the upper end of a T-shaped presser 57 which is adapted to slide vertically between guides 58. The lower end of the presser 57 bears against a conical spiral spring 59 formed of rectangular section material and mounted in a suitable casing 60. The underside of said spring is connected to a vertical bar 61 provided with rack-teeth which mesh with a pinion 62 fixed to a shaft to which is also secured a gear-wheel 63, the latter wheel meshes with a gear-wheel 64 fixed to an axle carrying the pointer of an indicating-dial 65. When used for brake testing, the mechanism just described will act in the same manner as that described with reference to Figures 1 to 4, inclusive, and by adjusting the screws 55, 56 the same reading can be obtained for either direction of rotation of the main shaft 31.

The apparatus shown in Figures 5 and 6, embodies means for measuring the load on a road-wheel, which will now be described, and it will be obvious that, if desired, this load-measuring means may be provided in the construction illustrated in Figures 1 to 4.

The load-measuring means comprises a lever 66, which is disposed adjacent the wheel-supporting roller 21, and is pivoted at one end to a side wall of the trough 20, as shown at 67. The other end of the pivoted lever 66 extends through an aperture 68 in the opposite wall of the trough 20 and in the rear wall of the part 24 of the triangular shaped casing. This end of the pivoted lever has a knife edge which bears against a substantially horizontal arm of a bell-crank lever 69, the other arm of which is substantially vertical and carries a knife edge 70 which bears against the aforesaid downwardly-extending arm 40 of the torque-measuring means. Approximately at the mid-point of its length, the pivoted lever 66 is secured to a short vertical screwthreaded rod 71 by means of a forked end 72 on the latter, and a bolt and nut 73. The screwthreaded rod 71 is engaged by a nut-like member 74 having a stem 75 adapted to project through a hole 76 in the base of the trough 20.

In order to ascertain the load on the wheel, the latter is supported on the rollers 21, 22, and the nut-like member 74 is turned, for example, by a tommy-bar, so that its stem 75 bears against the ground. Continued turning of the nut-like member will raise the pivoted lever 66, the latter will cause the bell-crank lever 69 to rock and the downwardly-extending arm 40 to swing so that the presser 57 will press upon the conical spiral spring 59. The pressure on said spring will be indicated on the dial 65, and when said pressure equals the load on the wheel further turning movement of the nut-like member 74 will cause the apparatus to tilt as a whole about the outer lower edge 77 (see Figure 5) of the triangular casing as a fulcrum.

It will be appreciated that the various pivoted levers and arms may be arranged and proportioned so that the dial 65 will indicate the desired proportion of the load on the wheel. This reading may be given in any desired units, and the knife edge 70 on the bell-crank lever 69 and the downwardly-extending arm 40 may be adjustably mounted for setting purposes, for example, by means of bolts and nuts 78, 79, engaging slots 80, 81 in the vertical arm of the bell-crank lever 69 and in the arm 40, respectively. Preferably, the mechanism is designed so that the maximum braking force which can be used with a normal co-efficient of friction on the road gives the same reading on the dial as the weight of the vehicle. Thus the provisions and use of charts showing the desirable braking effort for different weights of vehicles is obviated, since it is only necessary to ascertain the load on the wheel and adjust the brakes to give the same reading.

Instead of turning the apparatus by hand, a small electric motor may be provided for this purpose, and since such motors usually run at high speed, it is desirable to take the drive from the motor through a worm-gear to the reduction gear aforesaid. It will be appreciated that owing to the large ratio of reduction, only a small motor is necessary to turn the road-wheels, even when the brakes are strongly applied.

Another feature of the invention consists in providing a self-contained worm-gear which can be readily affixed to the apparatus in place of the handle 54. To this end, and referring now to Figures 7 and 8 of the drawings, the main shaft 31 may be provided with a clutch-member 82 and a bracket 83 may be secured to the part 25 of the triangular casing to support a gear-casing 84, in which is mounted a worm-wheel 85 meshing with a worm 86 on a spindle 87 which projects laterally from the gear-casing 84. The worm-wheel 85 is provided with a clutch-member 88 adapted to engage the clutch-member 82 on the shaft 31, and the gear-casing 84 has lugs 89 whereby it can be bolted to the triangular casing aforesaid. A bracket 90 may also be provided on the triangular casing to support an electric motor 91. Thus, by removing the handle 54, mounting the gear-casing 84 on the triangular casing with the clutch-member 88 in engagement with the clutch-member 82 and coupling the motor 91 to the worm-spindle 87, the apparatus can be readily driven by the motor.

Instead of using a pressure-gauge, such as 53, to measure the driving-torque, the depending arm 40 of the reduction gear may be spring-controlled, as shown diagrammatically in Figure 9. In this arrangement, two helical springs 92 are provided, whereof adjacent ends are connected to the depending arm 40, as shown at 93, and the other ends are secured to the triangular casing at 94. The lower end of the depending arm 40 carries a stud 95 which projects through a slot 96 in the part 25 of the triangular casing and which has at its outer end a pointer 97 adapted to move over a scale 98. It will be appreciated that when the depending arm 40 moves from its central position it compresses one and stretches the other of the two springs 92, the variation in the length of the spring being a measure of the torque applied.

A further modification of means according to the invention for measuring the driving torque, is illustrated in Figure 10. In this arrangement, the trough-shaped member 20, carrying the wheel-supporting rollers 21, 22, rests upon a stationary support 99, upon which said trough-shaped member can slide. The roller 22 is adapted to be driven by means of a chain-drive 100 through a reduction gear 101 from the main shaft 31, and the trough-shaped member 20 is operatively connected to the indicating-dial 65 by means of a toothed-rack 102 and pinion 103. A spring 104 surrounding the rack-bar 102 is interposed between an abutment 105 on the stationary support 99 and the end of the trough-shaped member 20. If a road-wheel is supported on the rollers 21, 22, with the brake applied, and the roller 22 is rotated, provided that the surface of said roller is such that it is capable of driving the road-wheel without slipping when the brake is fully applied, the tendency of the trough-shaped member 20 to move will be a measure of the braking effort. If desired, the shaft 27 of the roller 21 may extend through a slot 106 in the side of the trough-shaped member 20 to permit the latter to move without displacing the roller 21.

The testing of the brakes of a motor may be effected by turning the rollers through the reduction gear by hand, or by an electric motor, as hereinbefore described.

Obviously, various modifications can be made in the details of construction of this apparatus without departing from the scope of the present invention as defined by the appended claims.

I claim:

1. A portable device for testing the braking-power applied to the road-wheels of a motor vehicle, comprising a pair of rollers whereon a road-wheel can stand, manually operable driving means for said rollers which includes gearing so arranged that one element thereof is free to move bodily under the reaction of the driving torque, means for yieldably restraining such movement, and means controlled by such movement for measuring the reaction to the driving torque.

2. A portable device for testing the braking-power applied to the road-wheels of a motor vehicle, comprising a pair of rollers whereon a road-wheel can stand, manually operable driving means for said rollers which includes a reduction gear in the form of a back gear having a rotatable main shaft and a secondary shaft mounted so that it can swing about the axis of the main shaft, under the reaction of the driving torque, means operatively connecting the reduction gear to at least one of said rollers, means for yieldably restraining the swinging movement aforesaid, and a device operatively connected to one element of said restraining means for measuring the reaction to the driving torque.

3. A device for testing the braking-power applied to the road-wheels of a motor vehicle, comprising in combination a trough-shaped member, a pair of rollers whereon a road-wheel can stand mounted in said trough-shaped member, a reduction gear which is in the form of a back gear and comprises a rotatable main shaft and a secondary shaft mounted so that it can swing about the axis of the main shaft under the reaction of the driving torque, a chain sprocket on said main shaft, a chain-sprocket on each of said roller shafts, a single chain extending around the three sprockets aforesaid, means for yieldably restraining the swinging movement of said secondary shaft, and a device controlled by such movement for measuring the driving torque.

In testimony whereof I affix my signature.

WALTER HENRY WELCH.